United States Patent [19]

Kaufman

[11] 4,420,605
[45] Dec. 13, 1983

[54] COATING COMPOSITIONS HAVING DUAL CURING MECHANISMS

[75] Inventor: Marvin L. Kaufman, Bridgewater, N.J.

[73] Assignee: Mobil Oil Corporation, New York, N.Y.

[21] Appl. No.: 412,043

[22] Filed: Aug. 26, 1982

Related U.S. Application Data

[63] Continuation of Ser. No. 221,610, Dec. 31, 1980, abandoned.

[51] Int. Cl.$^3$ .................. C08G 59/50; C08G 59/64; C08G 59/68
[52] U.S. Cl. .................. 528/94; 525/504; 525/934; 528/111; 528/117; 528/103; 528/341; 528/361; 528/407
[58] Field of Search .................. 528/94, 103, 104, 111, 528/114, 117, 365, 361, 407

[56] References Cited

U.S. PATENT DOCUMENTS

| 3,394,105 | 7/1968 | Christie ............................... 528/94 |
| 3,507,831 | 4/1970 | Avis et al. ............................ 528/94 |
| 3,575,926 | 4/1971 | Joyce et al. ........................ 528/94 X |
| 3,634,323 | 1/1972 | Moran ................................. 528/94 |
| 3,677,978 | 7/1972 | Dowbenko et al. ............. 528/94 X |
| 3,756,984 | 9/1973 | Klaren et al. ...................... 528/94 |
| 3,816,366 | 6/1974 | Laudise .......................... 260/23 EP |
| 4,066,625 | 1/1978 | Bolger ............................. 260/59 R |
| 4,069,203 | 1/1978 | Carey et al. ........................ 528/94 |
| 4,358,571 | 11/1982 | Kaufman et al. .................. 525/524 |

FOREIGN PATENT DOCUMENTS

| 1215683 | 12/1970 | United Kingdom . |
| 1266016 | 3/1972 | United Kingdom . |
| 1366603 | 9/1974 | United Kingdom . |

*Primary Examiner*—Earl A. Nielsen
*Attorney, Agent, or Firm*—Alexander J. McKillop; James F. Powers, Jr.; John K. AboKhair

[57] ABSTRACT

This invention provides a coating composition comprising at least one 1,2 epoxy resin, a modified imidazole catalyst, and a polyfunctional phenol or polyfunctional acid or dicyandiamide.

21 Claims, No Drawings

COATING COMPOSITIONS HAVING DUAL CURING MECHANISMS

CROSS-REFERENCE TO RELATED APPLICATION

This application is a continuation of the copending application of Marvin L. Kaufman, said application having Ser. No. 221,610, filed Dec. 31, 1980, now abandoned.

BACKGROUND OF THE INVENTION

1. Field of the Invention

This invention is concerned with epoxy resin coating compositions.

2. Description of the Prior Art

In U.S. application Ser. No. 065,664 filed Aug. 10, 1979, now abandoned, there are disclosed modified imidazole catalysts for epoxy resins and powder coatings containing them. This invention provides improved epoxy coating compositions that give cured coatings of varying crosslink density.

SUMMARY OF THE INVENTION

This invention provides a coating composition comprising at least one 1,2 epoxy resin, a modified imidazole catalyst, and a polyfunctional phenol or polyfunctional acid or dicyandiamide.

DESCRIPTION OF SPECIFIC EMBODIMENTS

The epoxy resin in the coating composition of this invention can be any 1,2-polyepoxy resin. Preferred resins are the diglycidyl ethers of bis-phenols, particularly bisphenol A, and novolaks having a WPE (weight per epoxy) of between about 175 and about 4500. The choice of epoxy resins will depend upon the coating composition contemplated. For example, epoxy resins of >450 WPE can be used in powder coatings, wherein higher molecular weight resins are preferable. The lower molecular weight epoxy resins having a WPE between about 175 and about 450 can be used to prepare solution coatings, particularly high solids coating compositions. It is also contemplated to use small amounts of monoepoxy resins to control chain length.

The modified imidazole catalysts are disclosed in U.S. application Ser. No. 065,664, filed Aug. 10, 1979. This application is incorporated herein by reference in its entirety. In brief, the modified imidazole catalysts (curing agents) comprise an imidazole having the formula:

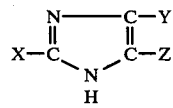

wherein X is hydrogen, methyl, ethyl, or phenyl and Y and Z are hydrogen or ethyl, methyl modified by addition of $C_1-C_{18}$ alkyl (meth) acrylate, by addition of a diglycidyl ether of a bisphenol or a 1,2-monoepoxide, or by carbamoylation; followed by neutralization with a lower fatty acid, a lower alkylene dicarboxylic acid, or an aromatic polycarboxylic acid.

The curing mechanism catalyzed by the modified imidazole is based on the homopolymerization of the epoxy resin with crosslinking. With this formulation in powder coatings, high molecular weight epoxy resins had to be used so that the crosslink density would be low enough to give useful properties.

In order to use lower molecular weight epoxy resins and to vary the properties of the cured coatings, it is necessary to include polyfunctional phenols, poly-functional acids, or dicyandiamide whose reaction with epoxy resins is also catalyzed by modified imidazoles. By including such polyfunctional materials, the structure of the cured polymer can be modified from a highly crosslinked polymer (homopolymer with no added polyfunctional reactant) to a more linear polymer. Using suitable variations in the molecular weight of the epoxy resin, the polyfunctional group reactants and the ratio of these, cured polymeric coatings of varying crosslink density and properties are obtained.

The polyfunctional materials are polycarboxylic aliphatic and aromatic acids, polyphenols, and dicyandiamide. Non-limiting examples include succinic acid, glutaric acid, adipic acid, pimelic acid, suberic acid, azelaic acid, sebacic acid, phthalic acid, isophthalic acid, maleic acid, aconitic acid, diphenols, such as bisphenol A, low molecular weight novolacs, and low molecular weight resoles.

The amount of modified imidazole catalyst used is in a ratio of between about 30:1 and about 1:1, expressed as the ratio of epoxide equivalents: imidazole equivalents. Preferably, the ratio is about 5–20:1. The amount of polyfunctional material used is between about 10 percent and about 150 percent of the equivalents of epoxy resin and polyfunctional material.

The coating composition can be a powder coating or a solution coating, particularly when the epoxy resin is a low molecular weight liquid resin. Depending upon the molecular weight of the epoxy resin, the coating solids content can be between about 35 percent and about 100 percent.

The solvents utilizable in solution coating compositions include alkoxyethanols having the formula $ROCH_2CH_2OH$ where R is $C_5-C_7$, $C_4-C_6$ alcohols, $C_4-C_6$ ketones, $C_5-C_{10}$ Carbitols, and acetates of the alcohols, ethoxyethanol, and Carbitols. Mixtures of two or more solvents are contemplated.

EXAMPLE 1

A solution of 150 g. DER 663U (WPE=750), 150 g. methyl ethyl ketone (MEK), and 10.7 g. imidazole catalyst. This catalyst was the imidazole modified by addition of Epon 828 (WPE=192) and neutralized with one equivalent of phthalic acid. Fifty gram aliquots were added varying amounts of bisphenol A (BPA), adipic acid, or dicyandiamide (DiCy). Drawdowns of the solutions were made on steel panels and cured at 300° F. for 15 minutes. Results are set forth in Table I.

TABLE I

| Base Solution | Additive (equivalent %) | Reverse Impact | MEK DR |
| --- | --- | --- | --- |
| 50 g (0.034 eq) | — | 160+ | 200 |
| " | BPA (25) | 160+ | 200 |
| " | BPA (50) | 160+ | 200 |
| " | BPA (100) | 160 | 200 |
| " | Adipic Acid (25) | 160+ | |
| " | Adipic Acid (50) | 160+ | |
| " | Adipic Acid (100) | 160+ | |
| " | DiCy (14) | 160+ | |
| " | DiCy (69) | 160+ | |
| " | DiCy (140) | 160+ | |

EXAMPLE 2

Solution coatings were made and tested as described in Example 1, except that the epoxy resin was low molecular weight Epon 828 (WPE=192). Drawdowns were made and tested as in Example 1. Results are set forth in Table II.

TABLE II

| Epon 828 | Additive (equivalent %) | Reverse Impact | MEK DR |
|---|---|---|---|
| Epon 828 | — | 160 | 200 |
| " | BPA (50%) | 160+ | 200 |
| " | Adipic Acid (50%) | 160 | 200 |

EXAMPLE 3

The utility of the invention can also be demonstrated in powder coating compositions. The following composition based on DER 663U and I828Ph (imidazole+828+1 mole phthalic acid) catalysts at a 15/1 epoxy equivalent to Imidazole equivalent ratio were pigmented at 25 wt. percent pigment. Three coatings were made and tested. The data is shown in Table III for 2 mil films cured 10 minutes at 300° F.

TABLE III

| Sample No. | Equivalent % BPA | Reverse Impact |
|---|---|---|
| 1126 | 0 | 32 |
| 1125 | 25 | 92 |
| 1124 | 50 | 100 |

Although the present invention has been described with preferred embodiments, it is to be understood that modifications and variations may be resorted to, without departing from the spirit and scope of this invention, as those skilled in the art will readily understand. Such modifications and variations are considerred to be within the purview and scope of the appended claims.

What is claimed is:

1. A coating composition comprising:
   (A) at least one 1,2 epoxy resin;
   (B) a modified imidazole catalyst comprising an imidazole having the formula:

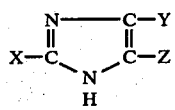

where
   X is methyl, ethyl, or phenyl and Y and Z are hydrogen or methyl; said imidazole being modified by addition of a $C_1$-$C_{18}$ alkyl (meth)acrylate, addition of a 1,2-monoepoxide or carbamoylation; followed by neutralization with a lower fatty acid, a lower alkylene dicarboxylic acid, or an aromatic polycarboxylic acid; and
   (C) a polyfunctional reactant selected from polyhydric phenols, polycarboxylic acids and dicyandiamide.

2. A coating composition of claim 1, wherein said epoxy resin is a diglycidyl ether of bisphenol A having a WPE of about 750.

3. A coating composition of claim 2, wherein the polyhydric phenol is bisphenol A.

4. A coating composition of claim 2, wherein the polycarboxylic acid polyfunctional reactant is adipic acid.

5. A coating composition of claim 2 containing dicyandiamide.

6. A coating composition of claim 1, wherein said epoxy resin is a diglycidyl ether of bisphenol A having a WPE of about 192.

7. A coating composition of claim 6, wherein the polyhydric phenol is bisphenol A.

8. A coating composition of claim 6, wherein the polycarboxylic acid polyfunctional reactant is adipic acid.

9. A coating composition comprising:
   (A) at least one, 1,2 epoxy resin;
   (B) a modified imidazole catalyst comprising an imidazole having the formula:

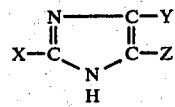

wherein
   X is methyl, ethyl, or phenyl and Y and Z are hydrogen or methyl said imidazole being modified by addition of $C_1$-$C_{18}$ alkyl (meth)acrylate, by addition of a 1,2-monoepoxide, or by carbamoylation; followed by neutralizatin with a lower fatty acid, a lower alkylene dicarboxylic acid, or an aromatic polycarboxylic acid, and
   (C) a polyfunctional reactant selected from polyhydric phenols and polycarboxylic acids.

10. A coating composition of claim 9, wherein said epoxy resin is a diglycidyl ether of bisphenol A having a WPE of about 750.

11. A coating composition of claim 10, wherein the polyhydric phenol is bisphenol A.

12. A coating composition of claim 10, wherein the polycarboxylic acid polyfunctional reactant is adipic acid.

13. A coating composition of claim 9, wherein said epoxy resin is diglycidyl ether of bisphenol A having a WPE of about 192.

14. A coating composition of claim 13, wherein the polyhydric phenol is bisphenol A.

15. A coating composition of claim 13, wherein the polycarboxylic acid polyfunctional reactant is adipic acid.

16. A coating composition comprising:
   (A) at least one epoxy resin which is a diglycidyl ether of bisphenol A;
   (B) a modified imidazole catalyst comprising an imidazole having the formula:

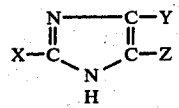

where
   X is methyl, ethyl, or phenyl and Y and Z are hydrogen or methyl; said imidazole being modified by adduction with a diglycidyl ether of bisphenol A, followed by neutralization with a lower fatty acid; and
   (C) bisphenol A.

17. A coating composition of claim 16 wherein the epoxy resin is a diglycidyl ether of bisphenol A having a WPE of about 750 and the imidazole is modified with a diglycidyl ether of bisphenol A having a WPE of about 192.

18. A coating composition of claim 16 wherein the epoxy resin is a diglycidyl ether of bisphenol A having a WPE of about 192 and the imidazole is modified with a diglycidyl ether of bisphenol A having a WPE of about 192.

19. A coating composition comprising:
(A) at least one epoxy resin which is a diglycidyl ether of bisphenol A;
(B) a modified imidazole catalyst comprising an imidazole having the formula:

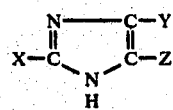

wherein
X is methyl, ethyl, or phenyl and Y and Z are hydrogen or methyl; said imidazole being modified by adduction with a diglycidyl ether of bisphenol A, followed by neutralization with a lower fatty acid a lower alkylene dicarboxylic acid, or an aromatic polycarboxylic acid; and
(C) bisphenol A.

20. A coating composition of claim 19 wherein the epoxy resin is a diglycidyl ether of bisphenol A having a WPE of about 750 and the imidozole is modified with a diglycidyl ether of bisphenol A having a WPE of about 192.

21. A coating composition of claim 19 wherein the epoxy resin is a diglycidyl ether of bisphenol A having a WPE of about 192 and the imidazole is modified with a diglycidyl ether of bisphenol A having a WPE of about 192.

* * * * *

UNITED STATES PATENT AND TRADEMARK OFFICE
CERTIFICATE OF CORRECTION

PATENT NO. : 4,420,605

DATED : December 13, 1983

INVENTOR(S) : MARVIN L. KAUFMAN

It is certified that error appears in the above-identified patent and that said Letters Patent is hereby corrected as shown below:

Column 6, line 12, insert "," after words fatty acid.

Signed and Sealed this

Thirteenth Day of November 1984

[SEAL]

Attest:

GERALD J. MOSSINGHOFF

Attesting Officer     Commissioner of Patents and Trademarks